May 12, 1925.
E. L. NASH
TIRE SHIELD
Filed March 27, 1924
1,537,366
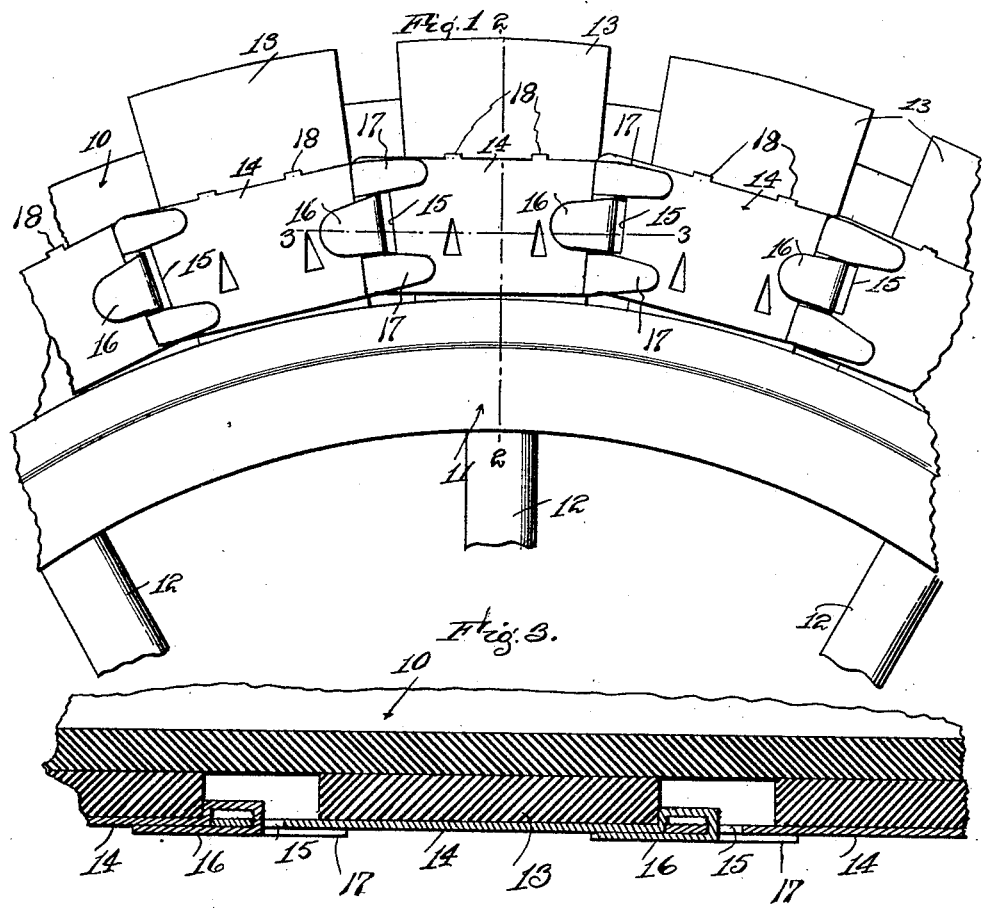
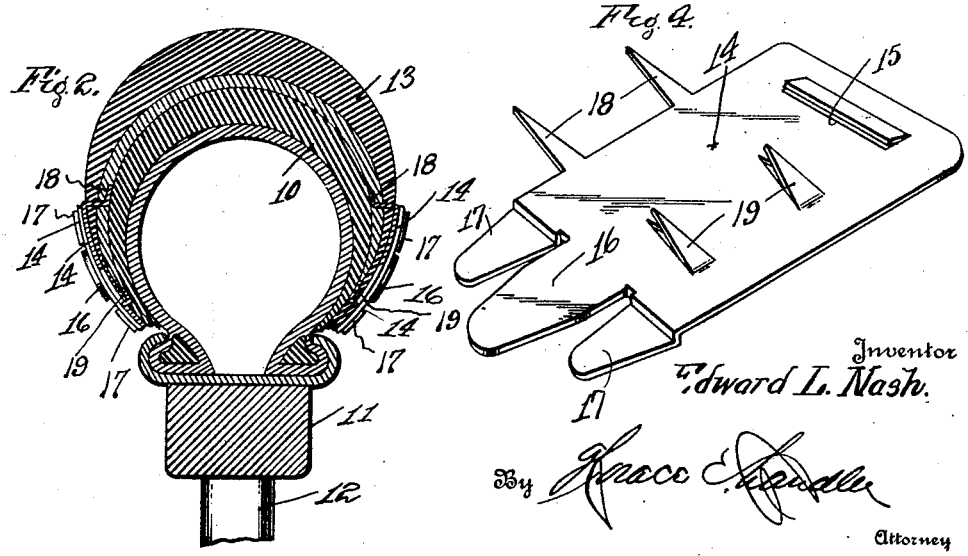
Inventor
Edward L. Nash.
By
Attorney Patented May 12, 1925.

1,537,366

UNITED STATES PATENT OFFICE.

EDWARD L. NASH, OF ST. LOUIS, MISSOURI.

TIRE SHIELD.

Application filed March 27, 1924. Serial No. 702,354.

*To all whom it may concern:*

Be it known that I, EDWARD L. NASH, a citizen of the United States, residing at St. Louis, State of Missouri, have invented certain new and useful Improvements in Tire Shields; and I do hereby declare the following to be a full, clear, and exact description of the invention, such as will enable others skilled in the art to which it appertains to make and use the same.

This invention relates to new and useful improvements in pneumatic tire devices and particularly to protecting shields therefor.

One object of the invention is to provide a shield for a pneumatic tire which is simple in construction, effective to protect the tread of a tire, and which can be manufactured at a comparatively low cost.

Another object is to provide a device of this character which can be easily and quickly applied to a tire, or removed therefrom, and which, when once properly secured in place, will not be liable to displacement.

Other objects and advantages will be apparent from the following description when taken in connection with the accompanying drawing.

In the drawing:

Figure 1 is a side elevation of a portion of a wheel, showing the protective shield applied thereto.

Figure 2 is a vertical, transverse sectional view on the line 2—2 of Figure 1.

Figure 3 is an enlarged horizontal sectional view on the line 3—3 of Figure 1.

Figure 4 is a perspective view of one of the metal plates removed from the shield.

Referring particularly to the accompanying drawing, 10 represents a portion of a pneumatic tire, 11 the portion of a wheel felly, and 12, fragments of the spokes. Engaged transversely across the tread of the tire, at regularly spaced intervals, are the transversely cut strips of a tire shoe 13, the ends of which lie at the sides of the tire 10, adjacent the felly 11. Disposed transversely on the outer face of each end of each of the strips 13, is a metal plate 14, said plate projecting beyond each edge of the strip. One of the projecting ends of the plate 14 is formed with a transverse slot 15, and on the other end thereof are the three tongues 16 and 17, the former of which is disposed centrally of the latter and is of slightly greater length and width, as clearly seen in the perspective view Figure 4. The tongues 17 are offset out of the plane of the plate 14 to a degree approximately equal to the thickness of the plate, for the purpose of receiving thereunder the slotted end of the next adjacent plate, and whereby the adjacent plates will lie in the same plane. The shorter tongues 17 extend longitudinally on the outer face of the next adjacent plate, while the larger tongue 16 is passed through the slot of the adjacent plate and bent back upon itself and upon the plate to which said tongue is attached. Struck from the outer longer edge of the plate 14 are the prongs 18, and from the body of the plate, adjacent the other longer edge are struck similar prongs 19, said prongs being driven through the end portion of the strip 13, and bent against the face thereof, whereby the plate 14 is secured fixed on the strip.

It will be noted that the ends of the plates 14 converge, thus producing a complete ring, when a series of plates are secured together, to extend around the tire. The series of plates 14 form rigid rings at the sides of the tire, while the portions of the strips 13, between the plates 14 are free to flex with the ordinary movements of the tire. By bending one of the tongues 16, at each side of the tire, and at corresponding points in the two series of plates 14, said tongues may be withdrawn from the slots of the adjacent plates, thus permitting the separation of the ends of the shield, and the removal of same from the tire.

What is claimed is:

1. A tire protector comprising a circular series of regularly spaced tire shoe sections, a metal plate having prongs secured through the end of a section, one end of the plate having a slot, the other end of the plate having a plurality of tongues, one of the tongues being engaged through the slot of the adjacent end of the next adjacent plate, the remaining tongues overlapping said adjacent plate.

2. The combination with a series of regularly spaced tire shoe sections, of connecting means therebetween comprising a metal plate on each end of each of the sections and having prongs secured through the end of the section, one end of each plate having a transverse slot, the other end of each plate having a pair of offset tongues arranged in overlapping relation to an adjacent plate, and an intermediate tongue engaged through said slot and extended back onto the plate.

In testimony whereof, I affix my signature, in the presence of two witnesses.

EDWARD L. NASH.

Witnesses:
W. R. CLEMENT,
EDW. L. ERLE.